Patented Aug. 17, 1948

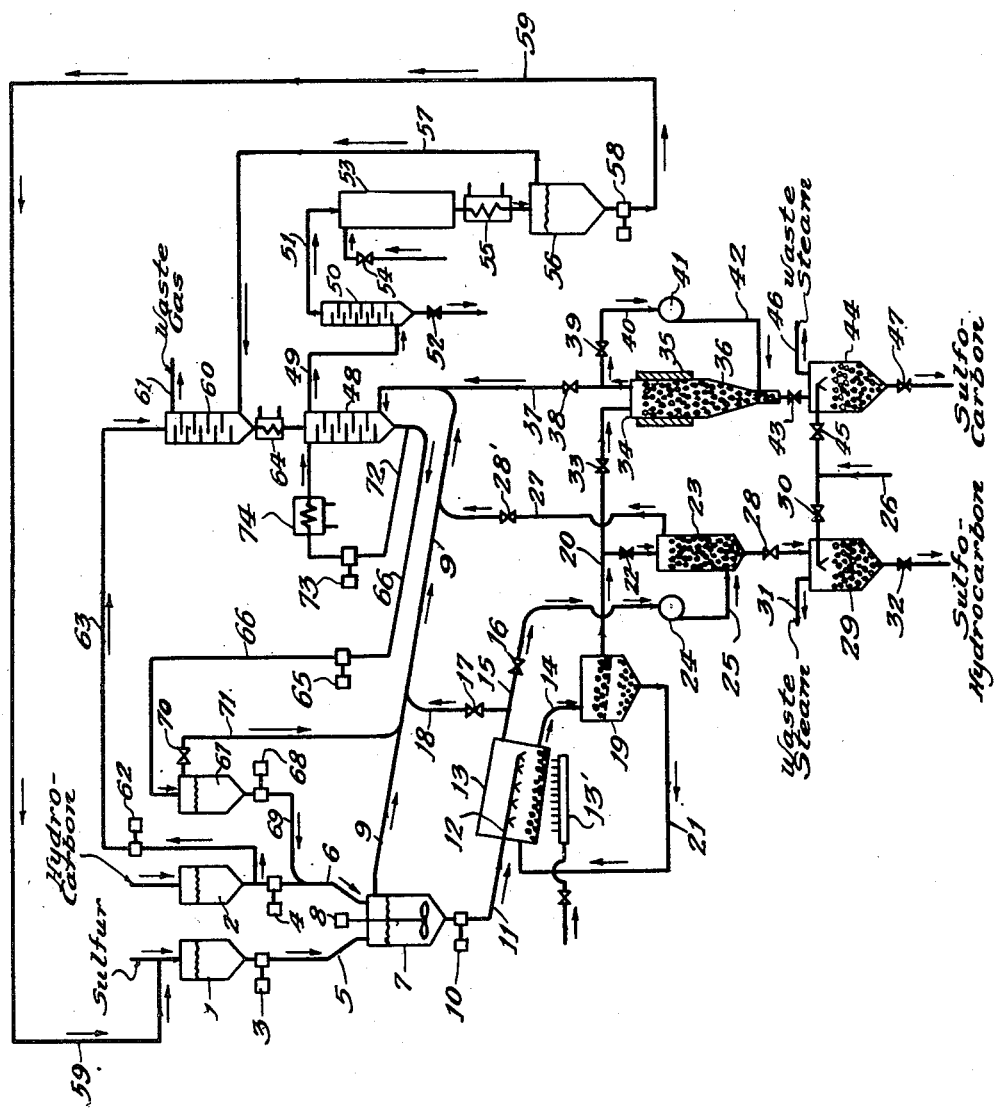

2,447,006

UNITED STATES PATENT OFFICE 2,447,006

PRODUCTION OF SULFO COMPOSITIONS

Bernard W. Gamson, Chicago, Ill., assignor to Great Lakes Carbon Corp., Morton Grove, Ill., a corporation of Delaware Application February 23, 1946, Serial No. 649,732

10 Claims. (Cl. 260—139)

This invention relates to a process for producing solid compositions of sulfur with carbon and hydrogen by the reaction of sulfur with suitable heavy hydrocarbons, such as described and characterized in my co-pending applications, Serial No. 649,730, filed February 23, 1946, and Serial No. 649,731, filed February 23, 1946, as "sulfohydrocarbons" and "sulfocarbons." This application is a continuation in part of my copending application Serial Number 546,427, filed July 24, 1944.

More particularly, the present invention relates to improvements in such processes and to the recovery of reactants from the gases evolved therein and their return to the process, with attendant economy and increased yield of products.

The sulfohydrocarbons are highly amorphous, substantially homogeneous, black, infusible solids having a real density of from about 1.3 to about 1.7, comprising sulfur substantially in chemical combination with carbon and hydrogen, the products being further defined and characterized by their following percentage by weight composition:

Carbon from about 47% to about 70%
Hydrogen from about 4.0% to about 1.8%
Sulfur from about 50% to about 25%
Ash negligible to about 2.5%

The foregoing defined sulfohydrocarbons are in general produced by intimately mixing and heating sulfur with suitable heavy hydrocarbons to form a liquid reaction mixture at a temperature of from about 300° F. to about 400-450° F., and then heating the liquid material to a temperature of from about 450° F. to about 575-625° F., to produce the solid reaction product.

These sulfohydrocarbons are useful for such purposes as fillers, reinforcing agents, preparation of adsorptive materials and other products and as an intermediate in the synthesis of other carbon compounds. They may also be employed in the production of the sulfocarbons.

The sulfocarbons are highly amorphous, hard, black, infusible solids comprising sulfur in stable chemical combination with carbon and hydrogen, having a density of from about 1.5 to about 1.9, the products being further defined and characterized by their following percentage by weight composition:

Carbon from about 70% to about 93%
Hydrogen from about 1.8% to about 0.3%
Sulfur from about 25% to about 6%
Ash from about 0.1% to about 2.5%

These sulfocarbons are useful for such purposes as fillers, reinforcing agents and adsorbents, and as intermediates in the synthesis and manufacture of other carbon compounds such as carbon tetrachloride and carbon disulfide. The sulfocarbons especially suited for the production of carbon disulfide of high purity and in substantially quantitative yield are those containing less than about 1.3% of hydrogen and generally result at a temperature of formation of about 1200° F. to about 1600° F., and preferably at about 1400° F.

The general steps of producing said products, as set forth in my co-pending application Serial No. 649,731, comprise (1) heating a selected organic feed with the proportioned amount of sulfur accompanied by good stirring, at a temperature of from about 300° F. to about 450° F., to provide a liquid reaction mixture; (2) converting the liquid material to a solid sulfohydrocarbon by spraying it to form a film generally upon a preformed solid granular or lump product at a temperature within the range of from about 450° F. to 625° F., and preferably not above about 575° F., to solidify the liquid film upon the solid and evolve a gaseous material comprising hydrogen sulfide, appreciable amounts of sulfur vapor and some volatile hydrocarbon products; (3) screening the solid lump product, recycling to spraying and solidification the "undersize" and passing the "oversize" on to further processing; (4) optional—withdraw a portion of the "oversize" solid to form a sulfohydrocarbon product which may be heat-soaked at 450° F. to 625° F., in an inert atmosphere comprising the gaseous products drawn from step (2), or let it degasify while cooling before discharging; in either case, additional amounts of hydrogen sulfide with some sulfur vapor and volatile hydrocarbon products are evolved; (5) converting the remaining portion or all of the sulfohydrocarbon "oversize" to a sulfocarbon by calcining it at a temperature in the range of 1100° F. to 1800° F., preferably not above about 1500° F., in an inert atmosphere usually self-generated. Depending upon the temperature, the hydrogen sulfide evolved may contain varying but appreciable amounts of sulfur vapor, some hydrogen, light hydrocarbons and other volatile reaction products.

The considerations which enter into the selection of the heavy hydrocarbons which are suitable for the reaction with sulfur and employed in the practice of this invention, and as further described in my cited co-pending applications, comprise in general the employment of hydrocarbons or mixtures thereof which boil above about 350° F. or are liquefiable below 400° F., and preferably below about 300° F. for the reaction with sulfur. Their hydrogen content is generally not less than about 4% nor greater than about 10 or 12%. This range of hydrogen content includes the olefinic and aromatic or highly condensed systems. The paraffins are not so desirable since at the temperature of sulfurizing, thermal carbonization and a high degree of cracking to volatile products ensues. Certain other hydrocarbons which use or melt above 400° F., even above 500° F., and which may contain less than 4% hydrogen are also useful raw materials. These, as distinguished from coals, are readily dissolved in the low melting or normally liquid heavy hydrocarbons, say, about 25% at 250° F. in a cracked residuum containing about 9% hydrogen and which melts at 85–90° F. Summing up, the hydrocarbons which are best suited for the production of the defined sulfocompositions comprise the tars or pitches from coal and petroleum, residua, topped crudes, the extraction residues from tars or pitches, the natural or derived asphalts, acid sludge hydrocarbon derivatives and the like.

The best proportion of sulfur to be employed in the reaction is substantially stoichiometrically equivalent to or slightly greater than the amount required to convert the hydrogen contained in the hydrocarbon feed to hydrogen sulfide. The preferred operating range for sulfur is from about 90% to about 110% of the equivalent since no serious departure from high yields or quality of the sulfo-compositions results thereby. In some instances, however, I may use as low as about 60% or as high as 160% of the hydrogen equivalent.

The ease of reaction of sulfur with the hydrocarbon and the degree to which its carbon is converted to a solid reaction product is correlated with the hydrogen content of the hydrocarbon. The unsaturated hydrocarbons of either an olefinic, aromatic or highly condensed nature react readily with sulfur between 300° F. and 400° F. so that a smoothly handled homogeneous reaction occurs which may, under proper conditions, yield substantially all of the carbon to a solid reaction product. When a hydrocarbon containing about 12% hydrogen is reacted with a stoichiometric amount of sulfur, about 85% of its carbon is converted to a solid product, the rest of the carbon passing off as volatile hydrocarbon products. The degree to which the carbon may be converted to a solid sulfo-composition becomes quantitative or nearly so as the original hydrogen content decreases to about 7% and below this value remains substantially quantitative.

The gaseous product evolved in the foregoing general process amounts to upwards of 60% or more of the reactants depending on the nature of the hydrocarbon, its hydrogen content, and on the temperatures which prevail throughout the process. In one instance, a petroleum pitch containing 8.5% hydrogen was reacted with a proportion of sulfur amounting to 134% by weight of the pitch and equivalent to the hydrogen, to an end temperature of 1400° F. A gaseous product was evolved amounting to 58.5% of the reactants and was composed as follows:

|  | Weight per cent |
|---|---|
| Hydrogen sulfide | 74.4 |
| Sulfur vapor | 14.0 |
| Carbon disulfide | 6.2 |
| Heavy hydrocarbon oils | 3.0 |
| Light hydrocarbon oils | 1.0 |
| $H_2$, $CH_4$, $C_2H_6$, etc. | 1.4 |
|  | 100.0 | and contained approximately 8% of the original carbon in the pitch. The amount of sulfur vapor and carbon compounds evolved with the hydrogen sulfide may vary considerably from the figures given above, depending primarily on the nature and hydrogen content of the hydrocarbon employed. The temperature, too, has its own effect, for instance, at an end temperature, say, about 1100° F., substantially no hydrogen, low molecular weight hydrocarbons or carbon disulfide are evolved.

It is, therefore, among the objects of the present invention to recover sulfur and hydrocarbon material from the foregoing evolved gases and to return them to the process. This comprises recovery of sulfur vapor and the condensable hydrocarbon products from the evolved gases, oxidation of the hydrogen sulfide to recover sulfur therefrom, and recovery of residual uncondensed sulfur from the waste oxidation gases.

In one specific embodiment my present invention relates to the removal of the sulfur vapor and condensable hydrocarbons from the hydrogen sulfide contained in the evolved gases prior to oxidation of the hydrogen sulfide, and which would otherwise interfere seriously with the oxidation thereof for the recovery of the combined sulfur in a free state for re-use in the process.

The removal of the sulfur vapor and a part of the condensable higher boiling hydrocarbon products from the hydrogen sulfide in the evolved gaseous process streams, and residual sulfur from the oxidation gases of hydrogen sulfide is accomplished by scrubbing the gaseous streams with the hot organic process feed. The remaining condensable and lower boiling hydrocarbons in the hydrogen sulfide stream are separated therefrom by condensation or other known means prior to the oxidation of the hydrogen sulfide to free sulfur.

In addition to cleaning up the hydrogen sulfide for oxidation, there is the further advantage of increasing the yields of the desired solid products by recovering that portion of the evolved condensable hydrocarbon products which are usefully reactive in the process with sulfur. By such recovery means, therefore, it becomes possible to convert 95% or more of the carbon to the desired solid products from any of the heavy hydrocarbons selected within the preferred range of hydrogen content. The small amount of carbon which is lost, particularly during the formation of sulfocarbons, is accountable then only to low molecular weight or normally gaseous hydrocarbons which are not usefully reactive in the process with sulfur and carbon disulfide, depending primarily on the end temperature of the process.

Thus, as specifically applied, for the purpose of illustration, to the hereinbefore outlined process and the enumerated steps thereof, the objects of the present invention may be accomplished by; (6) scrubbing the combined gaseous streams from steps (1) (2) (4) and (5) with the organic feed at a temperature in the range of 250° F. to 400° F., to absorb therefrom vaporous sulfur and the heavier hydrocarbon products which escaped complete reaction with sulfur; (7) separating any light condensable hydrocarbons from the hydrogen sulfide effluent of step (6); (8) oxidizing the hydrogen sulfide from step (7) by suitable means to recover therefrom its combined sulfur to be re-used in step (1); (9) scrubbing residual uncondensed sulfur from the waste oxidation gases of step (8) with the organic feed at about 250° F. to 300° F.; and (10) returning the enriched hydrocarbon streams from steps (6) and (9) to step (1) for reaction with added amounts of fresh organic charge if desired and the requisite amount of re-run and make-up sulfur as required.

The accompanying drawing diagrammatically illustrates an arrangement of apparatus suitable for carrying out the process and objects of the present invention.

Referring to the drawing, the sulfur and hydrocarbon charge enter zones 1 and 2 respectively, wherein the reactants are separately brought to a liquid state, the sulfur to about 300° F. or higher but below that at which it becomes viscous, and the hydrocarbon to a temperature of from about 250° F. to 350° F. Proportioned amounts of the reactants are delivered by pumps 3 and 4 through lines 5 and 6 into the reaction zone 7 and thoroughly agitated by stirrer 8 to make a homogeneous fluid mixture. The temperature in reaction zone 7 is selected in the range of from about 300° F. to 450° F. depending on the hydrocarbon. However, a considerable sulfurization reaction may be permitted to take place therein, in which case the preferred upper temperature is at about 400° F. or below in order to maintain control of the foaming which occurs. When desired, an initial sulfurization reaction in zone 7 may proceed to a point wherein about 5% or more of the hydrogen is evolved as hydrogen sulfide but not to the extent that the reaction mixture at this stage loses its liquid state. During such sulfurization reaction hydrogen sulfide which may contain some volatile or entrained hydrocarbon products is evolved and discharges through line 9 to be processed as later described.

The liquid mixture from zone 7 is forced by means of pump 10 through line 11 to a solidification zone 13 which may be a single unit rotary kiln as shown, or a parallel multiple thereof, wherein the reaction mixture is sprayed from openings 12 to form liquid films or layers upon a preformed solid granular or lump product at a temperature selected in the range of about 450° F. to 625° F., depending on the composition of the solid product desired. The temperature is preferably not above about 575° F. in order to obtain a more desirable relatively non-porous and mechanically homogeneous product. The heating requirements in zone 13 may be met by the external heater 13'. Solidification of the liquid films occurs with further evolution of hydrogen sulfide, generally in a matter of seconds and sometimes several minutes, depending somewhat on the hydrocarbon charged. Spraying and solidification continues until a desired growth of the granular solid, say, to about one inch diameter lumps, has been obtained. The gaseous product evolved in zone 13 and discharged into line 15 consists of hydrogen sulfide containing appreciable amounts of sulfur vapor and some volatile hydrocarbon reaction products. The overall residence time for the reaction and growth in zone 13 may be 30 minutes or more, depending on the temperature and the rates of growth, spraying or solidification, etc. The solid lump product is discharged through a suitable conveyor shown as line 14 to a size classifier 19 where it is screened to undersize and oversize. The undersize of less than, say, one inch diameter, is discharged into a conveyor shown as line 21 and fed into zone 13 to maintain a continuous re-seeding and growth cycle therein. The weight ratio of undersize recycled in zone 13 to oversize withdrawn from classifier 19 may vary from 1:1 to 4:1 or more, and depends upon the factors of rate of liquid solidification, rate of liquid feed, desired growth, mechanical attrition, etc. The oversize, say, about one inch diameter, discharging into a conveyor line 20, constitutes the intermediate sulfohydrocarbon product.

A portion of the sulfohydrocarbon discharging from the classifier 19 controlled by valves 22 and 33 may be withdrawn as desired into zone 23 where it may undergo further treatment such as degasification under heat-soaking or cooling conditions or merely direct transfer to the quenching zone 29. In the event a heat-soaking is desired to alter somewhat the composition of the product, it may be kept in zone 23 for a period of time at its temperature of formation or any other temperature in the range of 450° F. to 625° F.; additional gaseous products comprising hydrogen sulfide with some sulfur vapor are evolved. A convenient way to maintain the temperature in zone 23 and at the same time provide an inert atmosphere is accomplished by utilizing directly the sensible heat of the gases discharging from zone 13 into line 15. The hot gases controlled by valves 16 and 17 are forced by blower 24 into line 25 and thence through the charge in zone 23 and the spent gases, plus additional vaporous products evolving from the solid product, are discharged through line 27 and valve 28 to mingle with other process vapors in line 9, described later. In the event that simple degasification of the sulfohydrocarbon under conditions of cooling is desired, then valve 17 is opened to discharge the gaseous products from zone 13 into line 9; blower 24 and valve 16 are shut off. The evolving vapors from the charge kept in zone 23 for any period of time are discharged through line 27 and valve 28 into line 9. The sulfohydrocarbon is discharged from zone 23 through valve and line 28 into the quenching zone 29 where it is cooled with a water spray from line 26 controlled by valve 30; the quench vapors, mostly steam, are discharged through line 31. The cooled sulfohydrocarbon is withdrawn from the quenching zone 29 through valve and line 32 at a temperature of about 250° F. so that it may contain a minimum of absorbed water.

The remaining portion or all of the oversize discharging from classifier 19 through conveyor line 20 controlled by valves 22 and 33 passes to a calcining zone 34 where the intermediate sulfohydrocarbon is converted to a sulfocarbon. The calcining zone 34 may, for example, be a shaft furnace, either a single unit as shown or a parallel multiple thereof, and for the sake of simplicity the unit as shown comprises two sections in adjacent continuation, a calcining section 35 jacketed with a radiant heater, and a cooling-heat transfer section 36. The lump sulfohydrocarbon enters zone 34 from conveyor line 20 at a temperature of about 475° F. to 550° F. to form a continuous bed flowing therethrough and is calcined in section 35 to a temperature selected in the range of about 1100° F. to 1800° F., usually not exceeding about 1500° F. The flow of the bed through zone 34 is suitably regulated for the degree of calcining and heat-soaking desired; the soaking time after calcination may vary from, say, as little as 10 minutes to 3 or 4 hours or more. During the treatment in zone 34 a gaseous product is evolved comprising hydrogen sulfide containing vaporous sulfur and some gaseous and volatile hydrocarbons and minor amounts of other products such as hydrogen and carbon disulfide. The requirements for a relatively inert atmosphere comprising hydrogen sulfide during the calcination are met by the gaseous product evolved thereby. As the bed passes through the calcining section 35 it enters a cooling and heat-transfer (solid to gas) section 36. The gaseous product of calcination is discharged from zone 34 at around 500° F. to 550° F. or more into line 37 from which a portion controlled by valves 38 and 39, usually without change in temperature, is circulated by blower 41 from line 40 through line 42 to enter section 36 where the incoming inert atmosphere cools the downwardly moving calcined bed and passes upwardly to mingle with newly evolved gases in section 35 and to be discharged therewith into line 37. The overflow gaseous product from zone 34 is conducted away in line 37 to mingle with the gaseous streams from line 9 to be processed as soon described. The lump sulfocarbon composition which has been produced by the calcination is discharged from zone 34 through valve and line 43 into a quenching zone 44 where it is cooled with a water spray from line 26 controlled by valve 45; the quench vapors, mostly steam, are discharged through line 46. The cooled sulfocarbon is withdrawn from the quenching zone 44 through valve and line 47 at a temperature of about 250° F. so that it may contain a minimum of absorbed water.

The rate of temperature rise during the calcination producing the sulfocarbons is of importance for minimizing the amount of fines which may be induced by thermal strains or excessive internal pressures of evolving gases within the solid lumps. The rate of temperature rise found desirable does not exceed about 6° F. per minute at temperatures up to about 800° F., or until a substantial proportion of potentially volatile material has been evolved. Above about 800° F. the temperature rise should not exceed about 11° F. per minute until the end temperature of the calcination has been reached.

The combined gaseous products from lines 9 and 37 pass into a scrubbing zone 48 where substantially all of the sulfur vapor and the useful fraction of the condensable hydrocarbon products contained therein are absorbed by the liquid organic feed of the process flowing therethrough from heat transfer 64 at a temperature in the range of about 300° F. to 400° F. The temperature is such that the lighter hydrocarbons which are not useful for reaction with sulfur in the process remain substantially unabsorbed. A portion of the enriched organic feed discharging from absorber 48 is withdrawn in line 72 by proportioning pump 73 and recycled to absorber 48 after passing through heat exchanger 74. Depending upon the temperature of operation, the ratio of organic feed recycled to organic feed withdrawn in line 66 may vary from 0–10 or more. The gaseous effluent from scrubbing zone 48 is discharged into line 49 and passes into a separating zone 50 where the light hydrocarbons are removed either by condensation or by scrubbing out with a suitable wash oil. The gases discharging into line 51 now comprise hydrogen sulfide substantially free from sulfur vapor and condensable hydrocarbon products which would interfere with the oxidation step to follow; the stripped hydrogen sulfide stream may contain minor amounts of hydrogen, the normally gaseous hydrocarbons and carbon disulfide, depending on the calcining temperature employed in the process. The hydrogen sulfide discharging into line 51 passes into zone 53, where it may be oxidized to sulfur vapor with a proportioned amount of air admitted through line and valve 54 with a suitable temperature prevailing. The sulfur vapor produced in zone 53 is condensed to a liquid in zone 55 and flows into a receiving zone 56 from whence liquid sulfur is transferred by pump 58 and line 59 to charging zone 1 for re-use in the process. The waste gaseous oxidation products discharging from receiver 55 through line 57 pass into a scrubbing zone 60 where any residual uncondensed sulfur is absorbed by the liquid organic feed of the process flowing therethrough at a temperature of 250° F. to 350° F., usually the same as that in charging zone 2, from whence it is taken by means of pump 62 and line 63.

That portion of the enriched organic feed which is not recycled in scrubber 48 is transferred therefrom by proportioning pump 65 and line 66 to a charging zone 67 where is it kept at a temperature about the same as that in zone 2 and it is proportioned therefrom by pump 68 with fresh feed from zone 2 or none as the case may be and sufficient make-up sulfur from zone 1 to reaction zone 7 to continue the process initiating therein. The enriched hydrocarbon withdrawn from scrubber 48 may contain as much as 20% or more of dissolved sulfur and may constitute all or a part of the organic feed to zone 7, depending on what proportion is used for the scrubbing operations. Some reaction of the hydrocarbon with its dissolved sulfur evolving hydrogen sulfide will not be detrimental to the process so long as a fluid reaction product can be discharged from zone 7; hydrogen sulfide so produced is discharged in absorber 48 as well as from zone 67 through its discharge valve 70 and line 71 to mingle with the gaseous stream in line 9 to be processed further as already described.

Although the scrubbers 48 and 60 are shown to operate in series they may be operated independently, without departing from the effectiveness of the process, each with a fresh supply of the organic feed which, after use, are combined in zone 67.

The sulfur-hydrocarbon reaction takes place at substantially atmospheric pressures throughout the process. However, pressures somewhat above atmospheric may be employed in step (1) to suppress any tendency to volatilization of the hydrocarbons undergoing reaction, and in the scrubbing steps (6) and (9) to assist absorption of volatile matter therein.

Having now described the process and a specific embodiment thereof, the additional examples which follow will illustrate more fully the operation of the process and the nature of the products obtained therefrom.

EXAMPLE I

A petroleum pitch having the following properties,

| | |
|---|---|
| Softening point | ° F. 220 |
| Coke residue (A. S. T. M.) | percent 33.2 |
| Volatile (A. S. T. M.) | do 66.8 |
| Carbon | do 90.4 |
| Hydrogen | do 8.5 |
| Sulfur | do 1.0 |
| Ash | do 0.1 | was reacted with sulfur in the continuous process described. The proportion of sulfur in the reaction was approximately stoichiometrically equivalent to the hydrogen.

Two solid products were produced; a sulfohydrocarbon at 500° F. equivalent to 25% of the carbon in the charge, and a sulfocarbon at 1400° F. equivalent to approximately 71% of the carbon in the charge.

The hourly rate of charge to the process consisted of 1,000 lbs. hydrocarbon feed and 1,340 lbs. sulfur. At process equilibrium the charge was made up as follows:

Hydrocarbon

| | Pounds |
|---|---|
| Pitch | 963 |
| Recycle | 37 |
| Total | 1,000 |

Sulfur

| | Pounds |
|---|---|
| Fresh feed | 232 |
| From scrubbers | 174 |
| From H2S oxidation | 934 |
| Total | 1,340 |

Approximately 72% of the pitch was fed through the scrubbing zones to absorb residual sulfur from the waste hydrogen sulfide oxidation gases, and to absorb the vaporous sulfur and the usefully sulfur-reactive condensable hydrocarbons from the hydrogen sulfide effluent of the process; the sulfur thus absorbed amounted to about 25% of the weight of the pitch so used. A recycle ratio of 6:1 was used on the H2S scrubber.

The hydrocarbon-sulfur charge was reacted at 350° F. to 400° F. with goood agitation in the liquid state to the extent that approximately 10% of the hydrogen in the organic feed was evolved as hydrogen sulfide, amounting to 6.1% of the total charge.

The liquid reaction mixture was then sprayed within a rotary kiln at 500° F. to form thin films upon a preformed solid granular product; solidification of the films occurred within a few seconds. Spraying and solidification continued during about one-half hour until a solid, relatively non-porous and mechanically homogeneous product grown to approximately one inch size lumps and smaller had resulted. The solid product was discharged through a screen from which an oversize (about one inch) and an undersize (less than one inch) were obtained. The undersize was returned to the kiln to maintain a continuous solidification and growth operation. In this operation sufficient undergrowth and mechanical attrition occurred so that a ratio of two parts of undersize were recycled for each part of oversize discharged from the screen to form the intermediate product. One-fourth of the product was held in a soaking zone for about 10 minutes at 500° F. in a circulating inert atmosphere drawn from the kiln. The product was then quenched with water to a temperature of 250° F. and discharged from the process as a finished sulfohydrocarbon having substantially chemically combined composition of,

| | | |
|---|---|---|
| Carbon | percent | 60.00 |
| Hydrogen | do | 2.53 |
| Sulfur | do | 37.40 |
| Ash | do | .07 |
| | | 100.00 | and amounting to 15.6% of the charge. It contained 100% of the carbon content of the pitch so converted, that is to say, that the intermediate solid product from which this portion was withdrawn has fixed therein practically all of the carbon based on the pitch charged to the process. From the spraying operation to the finished sulfohydrocarbon there was produced a gaseous product amounting to 31.4% of the charge comprising hydrogen sulfide with some sulfur vapor and condensable hydrocarbon products.

The remaining three-fourths of the intermediate product was charged at a temperature of about 475° F. into a shaft furnace to form a moving bed therethrough and was calcined to 1400° F. in a recirculating self-generated inert atmosphere comprising hydrogen sulfide. The rate of temperature rise during the conversion of the sulfohydrocarbon to a sulfocarbon was about 6° F. per minute to 800° F. and not above 3° F. per minute thereafter until 1400° F. was reached, whereupon the sulfocarbon so produced was held at the calcining temperature for about 10 minutes before cooling to 500° F. by heat transfer to the incoming inert atmosphere. The cooled product was quenched with water to 250° F. and discharged from the process as a finished sulfocarbon having the substantially chemically combined composition of,

| | | |
|---|---|---|
| Carbon | percent | 85.80 |
| Hydrogen | do | 0.93 |
| Sulfur | do | 13.14 |
| Ash | do | .13 |
| | | 100.00 | and amounting to 31% of the charge. This product contained 95% of the carbon contained in that portion of the intermediate product so converted. During the calcination there was evolved a gaseous product amounting to 15.8% of the charge to the process comprising hydrogen sulfide with some sulfur vapor, carbon disulfide, gaseous and condensable hydrocarbons, and traces of hydrogen.

The combined gaseous process streams amounted to 53.4% of the charge and had approximately the following percentage composition,

| | |
|---|---|
| Hydrogen sulfide | 75.8 |
| Sulfur vapor | 13.9 |
| Carbon disulfide | 5.1 |
| Condensable hydrocarbon products | 4.0 |
| Gaseous hydrocarbons (CH4, C2H6, etc.) | 1.0 |
| Hydrogen | 0.2 |
| | 100.0 |

This gaseous stream was scrubbed with the indicated portion of molten pitch charge at about 375° F. to absorb therefrom substantially all of the vaporous sulfur and approximately 75% of the condensable hydrocarbon products representing the heavier portion thereof which, in this case, was usefully reactive with sulfur in the process. The hydrogen sulfide effluent from the scrubber was passed through a condenser wherein substantially all of the remaining condensable hydrocarbons were removed.

The stripped hydrogen sulfide stream was oxidized with a sufficient amount of air to just convert the combined sulfur to the free state; a non-conversion of about 1% of the combined sulfur prevailed. The sulfur was condensed to a fluid state of 300° F. and recycled in the process. A residual amount of uncondensed sulfur "fog" or vapor was recovered from the waste oxidation gases by scrubbing it with the molten pitch at 300° F. before passing the latter through a heater to the scrubber on the hydrogen sulfide stream.

EXAMPLE II

The petroleum pitch and a like proportion of sulfur as stated in Example I were reacted in the process to produce a sulfocarbon calcined at 1100° F. The temperature conditions, etc. in the zones other than calcining were the same as described in the foregoing example.

The hourly rate of charge to the process at equilibrium was made up as follows:

*Hydrocarbon*

| | Pounds |
|---|---|
| Pitch | 959 |
| Recycle | 41 |
| Total | 1,000 |

*Sulfur*

| | Pounds |
|---|---|
| Fresh feed | 225 |
| From scrubbers | 192 |
| From $H_2S$ oxidation | 923 |
| Total | 1,340 |

In this case, all of the molten pitch was fed through the scrubbing zones to absorb residual and vaporous sulfur and approximately 75% of the condensable hydrocarbons, which proportion was usefully reactive with sulfur in the process. The recycle ratio in the $H_2S$ scrubber was 5:1. The sulfur absorbed by the pitch in the scrubbing zones amounted to 20% of the weight of the pitch.

In this run, the step for processing a portion of the intermediate solid product to a finished sulfohydrocarbon was shut down and all of the intermediate was calcined at 1100° F. to a finished sulfocarbon composition. The calcining operation and subsequent quenching, except as to the calcining temperature of 1100° F., was as stated in Example I. The finished sulfocarbon was a substantially chemically combined composition composed as follows:

| | | |
|---|---|---|
| Carbon | per cent | 78.00 |
| Hydrogen | do | 1.54 |
| Sulfur | do | 20.37 |
| Ash | do | .09 |
| | | 100.00 | and amounted to 47% of the charge; the product contained 98.5% of the total carbon based on the pitch charged.

The combined gaseous process streams prior to scrubbing, etc. amounted to 53% of the charge and had approximately the following percentage composition:

| | |
|---|---|
| Hydrogen sulfide | 80.0 |
| Sulfur vapor | 15.5 |
| Condensable hydrocarbons | 4.5 |
| | 100.0 |

It was treated as described in Example I; about 1% of the combined sulfur was unconverted in the process.

I claim as my invention:

1. In a method for producing compositions of the class described, which comprises intimately admixing at a temperature of from about 300° F. and to about 450° F., hydrocarbon material having a hydrogen content of from about 4% to about 12% with sulfur in the proportion of from about 60% to about 110% of the stoichiometric hydrogen content of said hydrocarbon material to form a fluid reaction mixture, heating the resulting mixture at a temperature of from about 450° F. to about 625° F. to form a solid, and calcining said solid to a temperature of from about 1100° F. to about 1800° F., the steps which comprise oxidizing the hydrogen sulfide content of the gases evolved in said process, condensing free sulfur therefrom, and returning the sulfur to the initial reaction step of the process.

2. In a method for producing sulfo-compositions, which comprises intimately admixing at a temperature of from about 300° F. to about 450° F., hydrocarbon material having a hydrogen content of from about 4% to about 10% with sulfur in substantially stoichiometric proportion to said hydrogen content to form a fluid reaction mixture, further heating the resulting reaction mixture to a temperature not in excess of about 600° F. to form a solid, and calcining said solid in a relatively inert atmosphere to a temperature of from about 1100° F. to about 1500° F., the steps which comprise oxidizing the hydrogen sulfide content of the gases evolved in the process, after separating therefrom concomitant sulfur vapor and condensable hydrocarbon vapors, condensing resulting free sulfur therefrom, and returning the sulfur to the initial reaction step of the process.

3. In a method for producing sulfo-compositions, which comprises intimately admixing at a temperature of from about 300° F. to about 450° F., hydrocarbon material liquid at said temperature and selected from the group consisting of normally liquid hydrocarbons boiling above about 350° F., heavy hydrocarbons melting below about 400° F., and mixtures thereof with heavy hydrocarbons melting above about 400° F. and soluble therein, with sulfur in substantially stoichiometric proportion to said hydrogen content to form a fluid reaction mixture, further heating the resulting reaction mixture to a temperature not in excess of about 600° F. to form a solid, and calcining said solid in a relatively inert atmosphere to a temperature of from about 1200° F. to about 1600° F., the steps which comprise separating and recovering sulfur vapor and condensable heavy hydrocarbon material from the gases evolved in the process by scrubbing said gases with hydrocarbon charge for the process at a temperature of from about 250° F. to about 400° F., further separating from the remaining gases residual light condensable hydrocarbon content, oxidizing the hydrogen sulfide content of the thus purified gases, condensing resulting free sulfur therefrom, and returning the sulfur in liquid condition to the initial reaction step of the process.

4. In a method of producing sulfo-compositions, which comprises intimately admixing at a temperature of from about 300° F. to about 400° F., hydrocarbon material having a hydrogen content of from about 4% to about 12% with sulfur in substantially stoichiometrical proportion to said hydrogen content, to evolve at least 5% of the hydrogen as hydrogen sulfide and to form a liquid reaction mixture, spraying said reaction mixture while still in liquid condition into a separate reaction zone heated to a temperature of from about 450° F. to about 625° F., to solidify said liquid product in the form of particles and to evolve gaseous products therefrom comprising hydrogen sulfide, transferring the resultant solid particle product to a calcining zone and heating it therein to a temperature of from about 1100° F. to about 1800° F. in a relatively inert atmosphere comprising hydrogen sulfide formed in the process, the steps which comprise separating and recovering sulfur vapor and condensable heavy hydrocarbon material from the gases evolved in the process by scrubbing said gases with hydrocarbon charge for the process at a temperature of from about 250° F. to about 400° F., further separating from the remaining gases residual light condensable hydrocarbon content, oxidizing the hydrogen sulfide content of the thus purified gases, condensing resulting free sulfur therefrom, and returning the sulfur to the initial reaction step of the process.

5. In a method for producing sulfo-compositions of the class described, which comprises intimately admixing at a temperature of from about 300° F. to about 450° F., hydrocarbon material liquid at said temperature and sulfur in substantially stoichiometrical proportion to the hydrogen content of said hydrocarbon material to form a fluid reaction mixture, further heating said reaction mixture to a temperature of from about 450° F. to about 625° F., to form a solid, and calcining said solid to a temperature of from about 1100° F. to about 1800° F., the steps which comprise collecting the effluent gases from said process, scrubbing them with hydrocarbon charge for the process at a temperature of from about 250° F. to about 400° F., to absorb therefrom vaporous sulfur and heavy hydrocarbon material which escaped complete reaction with sulfur, further separating from the gases light condensable hydrocarbon content, oxidizing remaining hydrogen sulfide to form free sulfur, condensing the resulting sulfur and returning it to the initial reaction step of the process, and scrubbing residual uncondensed sulfur from the waste gases of said oxidation step with liquid hydrocarbon charge for the process at a temperature of from about 250° F. to about 300° F.

6. In a method of producing sulfo-compositions, which comprises intimately admixing at a temperature of from about 300° F. to about 450° F. hydrocarbon material liquid at said temperature with sulfur in substantially stoichiometrical proportion to said hydrogen content, to form a liquid reaction mixture, spraying said reaction mixture while still in liquid condition in the form of films onto previously formed solid sulfohydrocarbon particles contained in a separate reaction zone heated to a temperature of from about 450° F. to about 625° F. while tumbling the particles therein and continuously moving them therethrough to solidify said liquid product on said particles and to evolve gaseous products therefrom comprising hydrogen sulfide, segregating relatively small from relatively large particle products, returning said smaller particles to said reaction zone, transferring the larger solid particle product to a calcining zone and gradually heating it therein to a temperature of from about 1100° F. to about 1800° F. in a relatively inert atmosphere comprising largely hydrogen sulfide formed in the process, the steps which comprise collecting the effluent gases from said process, scrubbing them with hydrocarbon charge for the process at a temperature of from about 250° F. to about 400° F. to absorb therefrom vaporous sulfur and heavy hydrocarbon material which escaped complete reaction with sulfur, further separating from the gases light condensable hydrocarbon content, oxidizing remaining hydrogen sulfide to form free sulfur, condensing the resulting sulfur and returning it to the initial reaction step of the process, and scrubbing residual uncondensed sulfur from the waste gases of said oxidation step with liquid hydrocarbon charge for the process at a temperature of from about 250° F. to about 300° F.

7. In a method for producing sulfo-compositions, which comprises intimately admixing at a temperature of from about 300° F. to about 450° F. hydrocarbon material having a hydrogen content of from about 4% to about 12% with sulfur in the proportion of from about 60% to about 110% of the stoichiometric hydrogen content of said hydrocarbon material to form a fluid reaction mixture, and heating the resulting reaction mixture at a temperature of from about 450° F. to about 625° F. to form a solid product, the steps which comprise oxidizing the hydrogen sulfide content of the gases evolved in the process after separating therefrom concommitant sulfur vapor and condensable hydrocarbon vapors, condensing resulting free sulfur therefrom, and returning the sulfur in liquid condition to the initial reaction step of the process.

8. In a method of producing sulfo-compositions, which comprises intimately admixing at a temperature of from about 300° F. to about 450° F., hydrocarbon material liquid at said temperature and selected from the group consisting of normally liquid hydrocarbon boiling above 350° F., heavy hydrocarbons melting below about 400° F., and mixtures thereof with heavy hydrocarbons melting above about 400° F. and soluble therein, with an amount of sulfur in the proportion of from about 90% to about 110% of the stoichiometric equivalent of the hydrogen content of the hydrocarbon material, to form a liquid reaction mixture, spraying said reaction mixture, while still in liquid condition in the form of films onto solid particle product formed in the process and contained in a separate reaction zone, and tumbling and moving said coated particles through said zone while heating them at a temperature of from about 450° F. to about 625° F. to solidify said sprayed material, the steps which comprise separating and recovering sulfur vapor and condensable heavy hydrocarbon material from gases evolved in the process by scrubbing said gases with hydrocarbon charge for the process at a temperature of from about 250° F. to about 400° F. further separating from the remaining gases residual light condensable hydrocarbon content, oxidizing hydrogen sulfide content of the thus purified gases, condensing resulting free sulfur therefrom, and returning the sulfur to the initial reaction step of the process.

9. In a method of producing sulfo-compositions, which comprises intimately admixing at a temperature of from about 300° F. to about 400° F. hydrocarbon material having a hydrogen content of from about 4% to about 10% with sulfur in substantially stoichiometrical proportion to said hydrogen content, to evolve at least 5% of the hydrogen as hydrogen sulfide and to form a liquid reaction mixture, spraying films of said reaction mixture while still in liquid condition onto solid particle product formed in the process and contained in a separate reaction zone and agitating and heating the material therein at a temperature of from about 450° F. to about 575° F. to solidify the sprayed material onto said particles, to evolve therefrom gaseous materials comprising hydrogen sulfide and to form a homogeneous solid particle product, and returning a portion of the solid particle product to said separate reaction zone as aforesaid, the steps which comprise collecting the effluent gases from said process, scrubbing them with hydrocarbon charge for the process at a temperature of from about 250° F. to about 400° F. to absorb therefrom vaporous sulfur and heavy hydrocarbon material which escaped complete reaction with sulfur, further separating from the gases light condensable hydrocarbon content, oxidizing remaining hydrogen sulfide to form free sulfur, condensing the resulting sulfur and returning it to the initial reaction step of the process, and scrubbing residual uncondensed sulfur from the waste gases of said oxidation step with liquid hydrocarbon charge for the process at a temperature of from about 250° F. to about 300° F.

10. In the process wherein a liquid phase reaction mixture of sulfur and hydrocarbon material are reacted at a temperature of from about 450° F. to about 625° F. to form a solid product and the solid product calcined to a temperature of from about 1100° F. to about 1800° F., the steps which comprise collecting the effluent gases from said process, scrubbing them with hydrocarbon charge for the process in liquid condition at a temperature of from about 250° F. to about 400° F. to absorb therefrom vaporous sulfur and heavy hydrocarbon material content, further separating from the gases light condensable hydrocarbon content, oxidizing hydrogen sulfide content of the remaining gases to form free sulfur, and condensing and returning resultant free sulfur to the process.

BERNARD WM. GAMSON.

REFERENCES CITED

The following references are of record in the file of this patent:

UNITED STATES PATENTS

| Number | Name | Date |
|--------|------|------|
| 480,235 | Dubbs | Aug. 2, 1892 |
| 898,378 | Kohler | Sept. 8, 1908 |
| 1,157,935 | Gray | Oct. 26, 1915 |
| 1,824,523 | Adams | Sept. 22, 1931 |
| 1,896,227 | Egloff | Feb. 7, 1933 |
| 2,090,187 | Credo | Aug. 17, 1937 |
| 2,109,692 | Forney | Mar. 1, 1938 |
| 2,147,578 | Hendrey | Feb. 14, 1939 |
| 2,178,325 | Kobbe | Oct. 31, 1939 |
| 2,210,877 | Bray | Aug. 13, 1940 |
| 2,312,750 | Cohen | Mar. 2, 1943 |
| 2,330,934 | Thacker | Oct. 5, 1943 |
| 2,372,230 | Sommer | Mar. 27, 1945 |
| 2,380,466 | Reiff | July 31, 1945 |
| 2,399,717 | Arveson | May 7, 1946 |